United States Patent
Sakai et al.

(10) Patent No.: US 10,672,565 B2
(45) Date of Patent: Jun. 2, 2020

(54) ELECTRONIC COMPONENT

(71) Applicant: NICHICON CORPORATION, Kyoto (JP)

(72) Inventors: Takaya Sakai, Kyoto (JP); Mitsuru Yoneda, Kyoto (JP); Kazuhiro Yasukawa, Kyoto (JP); Yuichi Kanayama, Tokyo (JP); Shingo Sakata, Tokyo (JP)

(73) Assignee: NICHICON CORPORATION, Kyoto-Shi (JP)

( * ) Notice: Subject to any disclaimer, the term of this patent is extended or adjusted under 35 U.S.C. 154(b) by 0 days.

(21) Appl. No.: 16/094,909

(22) PCT Filed: Apr. 11, 2017

(86) PCT No.: PCT/JP2017/014834
§ 371 (c)(1),
(2) Date: Oct. 19, 2018

(87) PCT Pub. No.: WO2017/183521
PCT Pub. Date: Oct. 26, 2017

(65) Prior Publication Data
US 2019/0131078 A1    May 2, 2019

(30) Foreign Application Priority Data
Apr. 16, 2016    (JP) .................................. 2016-083421

(51) Int. Cl.
*H01G 9/08*    (2006.01)
*H01G 11/78*    (2013.01)
(Continued)

(52) U.S. Cl.
CPC ............. *H01G 9/10* (2013.01); *H01G 9/0003* (2013.01); *H01G 9/02* (2013.01); *H01G 9/045* (2013.01);
(Continued)

(58) Field of Classification Search
None
See application file for complete search history.

(56) References Cited

U.S. PATENT DOCUMENTS

| | | | |
|---|---|---|---|
| 3,509,427 A * | 4/1970 | Ruscetta .................. | H01G 9/08 361/519 |
| 8,390,986 B2 * | 3/2013 | Oh ......................... | H01G 9/016 361/502 |

(Continued)

FOREIGN PATENT DOCUMENTS

| CN | 102509644 | 6/2012 |
|---|---|---|
| CN | 102723210 | 10/2012 |

(Continued)

OTHER PUBLICATIONS

EPO., Supplementary European Search Report of EP 17785860.2 dated Dec. 6, 2019.

*Primary Examiner* — Dion Ferguson
(74) *Attorney, Agent, or Firm* — Lex IP Meister, PLLC (57) ABSTRACT

An aluminum electrolytic capacitor includes: an exterior case of a bottomed cylindrical shape for accommodating a capacitor element in which an anode foil and a cathode foil are wound in an overlapping manner with a separator interposed therebetween; and an elastic sealing member for sealing an opening of the exterior case, wherein the exterior case is formed with, on an outer circumferential surface, a plurality of tapered concave portions whose depth in the radial direction becomes shallow from the bottomed cylindrical bottom toward the opening side, whereby a tapered raised portion, which is raised toward the center side in the radial direction, is formed on an inner circumferential surface located on the back surface of the concave portion, and the capacitor element is abutted and supported by the raised portion.

4 Claims, 11 Drawing Sheets

(51) Int. Cl.
*H01G 9/10* (2006.01)
*H01G 9/06* (2006.01)
*H01G 9/048* (2006.01)
*H01G 9/00* (2006.01)
*H01G 9/02* (2006.01)
*H01G 9/042* (2006.01)
*H01G 9/045* (2006.01)
*H01G 9/055* (2006.01)

(52) U.S. Cl.
CPC ........... *H01G 9/048* (2013.01); *H01G 9/0425* (2013.01); *H01G 9/055* (2013.01); *H01G 9/06* (2013.01); *H01G 9/08* (2013.01); *H01G 11/78* (2013.01)

(56) References Cited

U.S. PATENT DOCUMENTS

| | | | | |
|---|---|---|---|---|
| 8,717,740 | B2 * | 5/2014 | Ashino | .................. H01G 9/008 361/511 |
| 9,053,858 | B2 * | 6/2015 | Mori | ...................... H01G 9/008 |
| 2003/0117762 | A1 | 6/2003 | Takeishi et al. | |
| 2006/0168787 | A1 * | 8/2006 | Will | ......................... H01G 9/06 29/25.03 |
| 2013/0027846 | A1 | 1/2013 | Ashino et al. | |
| 2015/0243453 | A1 * | 8/2015 | Taguchi | ................. H01G 9/048 361/502 |

FOREIGN PATENT DOCUMENTS

| | | |
|---|---|---|
| CN | 102737854 | 10/2012 |
| CN | 206726964 | 12/2017 |
| DE | 904083 | 2/1954 |
| JP | 54-62044 | 5/1979 |
| JP | 61-27231 | 2/1986 |
| JP | 10-022176 | 1/1998 |
| JP | 11-251201 | 9/1999 |
| JP | 2000-124086 | 4/2000 |
| JP | 2003-173942 | 6/2003 |
| JP | 2003-243266 | 8/2003 |
| JP | 4763110 | 8/2011 |
| JP | 2015-162471 | 9/2015 |

* cited by examiner

ELECTRONIC COMPONENT

TECHNICAL FIELD

The present invention relates to an electronic component used in electrical equipment, vehicles, and the like.

BACKGROUND ART

In recent years, environments in which electronic components are used in vehicles as well as in electrical equipment have been diversified. Therefore, environmental resistance is strongly required for electronic components used in electrical equipment and the like. Specifically, electronic components having high mechanical strength and excellent vibration resistance are required. However, cylindrical electronic components such as electrolytic capacitors, electric double layer capacitors, and lithium ion capacitors tend to be vulnerable to vibration because they stand upright on a circuit board and the electrode terminals are fixed by solder or the like.

Therefore, in order to satisfy the requirement, the following forms are implemented. For example, an inner bottom corner portion of a bottomed cylindrical metal case accommodating an element is cladded to form a tapered portion tapering toward the inner bottom surface, the outer periphery of the cylindrical element is covered with a separator longer than the cylindrical length, and the separator protruding from the cylindrical portion is pressed against the tapered portion and crushed, thereby securing the insertion distal end side while protecting the corner portion of the element (see PTL 1).

CITATION LIST

Patent Literature

PTL 1: Japanese Patent Application Laid Open No. 2015-162471

SUMMARY OF INVENTION

Technical Problem

However, in the case described in PTL 1, since only the corner portion on the insertion distal end side of the cylindrical element is brought into contact with the tapered portion, when the element is repeatedly subjected to strong vibration from the outside, the amplitude of the element is increased as the element gets over the tapered portion, resulting in the disadvantage that a lead-out terminal connected to the element is broken. Further, in the case where the element is not uniformly pressed against the tapered portion, a problem arises in that the corner portion of the capacitor element which is biased against the tapered portion is locally pressed and damaged even if the corner portion is covered with the separator.

An object of the invention is to provide an electronic component having a simple structure and excellent vibration resistance.

Solution to Problem

The invention provides the following electronic component.

That is, the electronic component according to an embodiment of the invention has the following configuration.

An electronic component includes:

an element in which an anode foil and a cathode foil are wound with a separator interposed therebetween;

an exterior case of a bottomed cylindrical shape which accommodates the element; and a sealing body which seals an opening of the exterior case, wherein the outer circumferential surface of the exterior case is formed with a plurality of tapered first concave portions whose depth in the radial direction becomes shallow from the bottom of the bottomed cylindrical shape toward the open end of the exterior case, whereby a tapered first raised portion, which is raised toward the center in a radial direction, is formed on an inner circumferential surface of the case located on the back surface of the first concave portion, and the element is abutted and supported by the first raised portion.

According to this configuration, in a process of inserting the element into the exterior case, the element is accommodated at the bottom of the exterior case while being centrally disposed by the first raised portion. That is, the first raised portion functions as a guide. Further, a plurality of the first raised portions are formed, for example, at predetermined intervals on the inner circumferential surface of the exterior case. Thus, when the element varies in diameter or shape, for example, when the element has a portion of a partially large external dimension, the portion is guided so as to be separated from the contacting raised portion and inserted between adjacent raised portions. Accordingly, the element can be prevented from being applied with excessive pressing by contact with the first raised portion, and consequently, damage to the element can be prevented. Further, since the circumferential surface of the element from the distal end toward the proximal end is in contact with the first raised portion in a predetermined area, the pressing force on the element is dispersed.

Further, in the above-described configuration, it is preferable that the bottom of the exterior case is formed with a second concave portion which is formed to extend from the outer circumference of the bottom toward the center of the bottom, and is recessed inward in the axial direction of the case, whereby a second raised portion protruding toward the open end of the exterior case is formed on the back surface of the bottom of the case located on the back surface of the second concave portion.

According to this configuration, since the insertion distal end side of the element comes into contact with the second raised portion formed on the back surface side of the bottom of the exterior case, the element can be more stably abutted and supported by the inner circumferential surface and the inner bottom surface of the exterior case. As a result, the vibration resistance is higher than in the case where only the outer periphery of the element is abutted and supported by the first raised portion.

In the above configuration, it is preferable that the element is wound in a state in which the cathode foil and the separator protrude in the axial direction from the anode foil, and the second raised portion is in contact with the cathode foil and the separator.

According to this configuration, since the cathode foil and the separator protruding from the anode foil toward the bottom contact the raised portion on the bottom of the exterior case, the exterior case can function as a heat sink through the raised portion. Therefore, it is possible to configure an electronic component having an excellent heat dissipation effect.

Further, in the above configuration, it is preferable that a top portion on the center side in the radial direction of the first raised portion is formed perpendicular to the bottom of the exterior case to extend a predetermined length along the axial direction from the outer circumference on the bottom side of the case.

According to this configuration, since a contact length between the raised portion and the element is longer than that of the tapered raised portion in which the height of the raised portion is lower from the outer circumference on the bottom side, the vibration resistance can be improved.

Advantageous Effects of Invention

According to the invention, it is possible to provide a capacitor having a simple configuration, high mechanical strength, and high environmental performance such as vibration resistance.

DESCRIPTION OF EMBODIMENTS

Embodiments of the invention will be described in detail with reference to attached drawings. In the embodiments, an electrolytic capacitor is used as an example of an electronic component.

Figure 1:
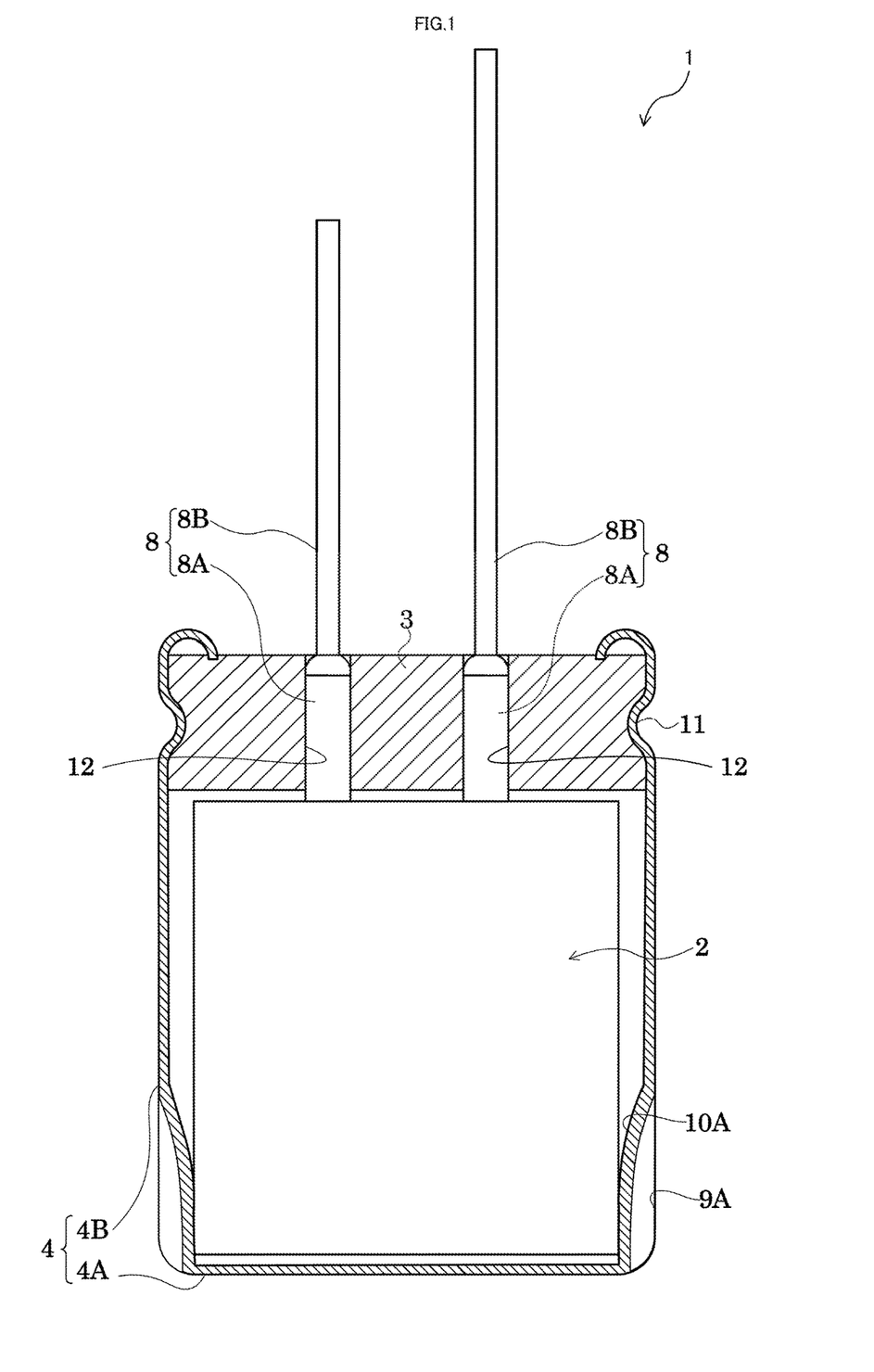
FIG. 1 is a cross-sectional view showing a configuration of an electrolytic capacitor according to the invention.

As shown in FIG. 1, an electrolytic capacitor 1 of the embodiment includes a capacitor element 2, an elastic sealing member 3, and an exterior case 4. The capacitor element 2 corresponds to an element of the invention, and the elastic sealing member 3 corresponds to a sealing body of the invention.

Figure 2:
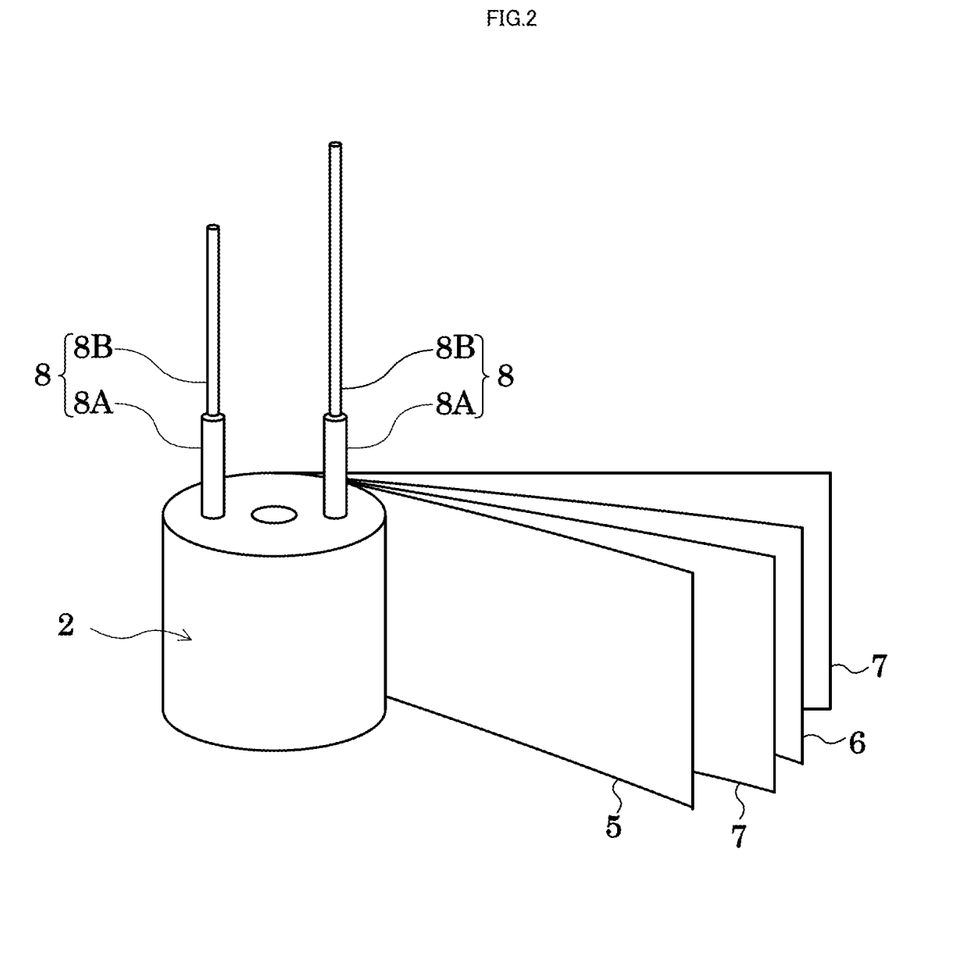
FIG. 2 is an exploded perspective view of a capacitor element used in the electrolytic capacitor according to the invention.

As shown in FIG. 2, the capacitor element 2 consists of a winding portion in which an anode foil 5 and a cathode foil 6 are wound with a separator (electrolytic paper) 7 interposed therebetween. The outermost periphery of the capacitor element 2 is covered with the separator 7.

Flat lead tabs (not shown) are connected to the anode foil 5 and the cathode foil 6, respectively, and lead portions 8 are drawn out from the anode foil 5 and the cathode foil 6 through the lead tabs, respectively. The two lead portions 8 are drawn out from one end face of the capacitor element 2. Each lead portion 8 has a round bar-shaped connection unit 8A connected to the distal end of the lead tab and a lead wire 8B welded to the distal end of the connection unit 8A.

The anode foil 5 is made of a valve metal such as aluminum, tantalum, or niobium. The surface of the anode foil 5 is roughened by etching, and an anodized film (not shown) is formed by anodization (i.e., chemical reaction).

Similar to the anode foil 5, the cathode foil 6 is made of aluminum or the like, and the surface of the anode foil 5 is roughened and a natural oxide film (not shown) is formed thereon. For the cathode foil 6, a foil on which an anodized film is formed, a foil on a surface of which titanium, titanium nitride, or the like is vapor-deposited, or a foil carrying carbon, titanium, or the like can also be used.

A driving electrolyte is retained on the separator 7. Consequently, the driving electrolyte is retained between the anode foil 5 and the separator 7, and the driving electrolyte is also retained between the cathode foil 6 and the separator 7. The driving electrolyte is retained by immersing the capacitor element 2 into the driving electrolyte.

As shown in FIG. 1, the capacitor element 2 is accommodated in the exterior case 4, which has as a bottomed cylindrical shape.

Figure 3:
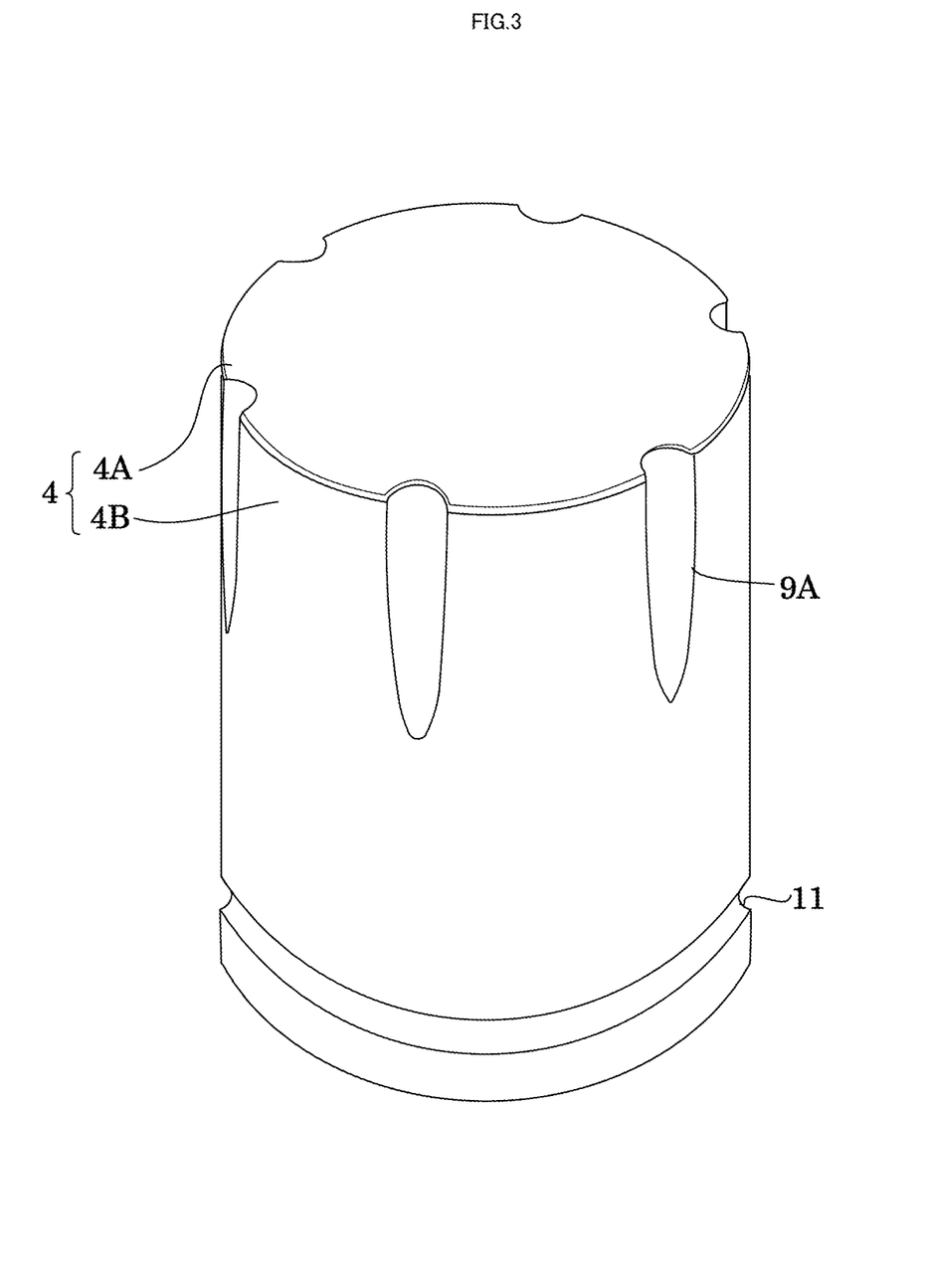
FIG. 3 is a perspective view showing an exterior case used in the electrolytic capacitor according to the invention.
Figure 4:
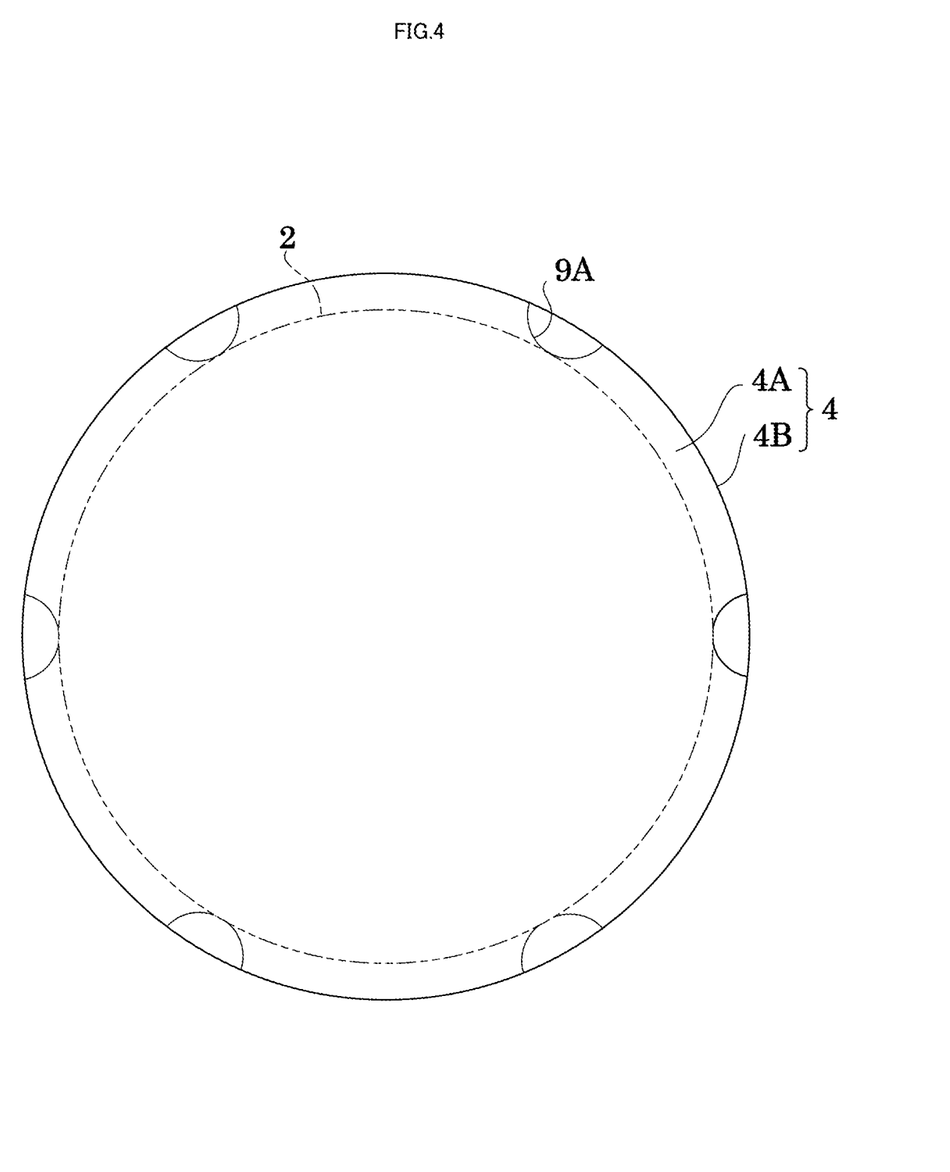
FIG. 4 is a bottom view showing the exterior case used in the electrolytic capacitor according to the invention.

The exterior case 4 is made of aluminum or the like. The exterior case 4 is shown in FIGS. 3 and 4, and for convenience of description, the bottom is directed upward. As shown in FIGS. 3 and 4, in the exterior case 4, a plurality of tapered concave portions 9A (corresponding to first concave portions) are formed on an outer circumferential surface 4B at predetermined intervals (which are equal intervals in this embodiment), each concave portion having a depth in the radial direction that becomes shallow from the bottom 4A of the bottomed cylindrical shape toward the open end of the exterior case 4. An inner circumferential surface located on the back surface of the concave portion 9A has a tapered raised portion 10A (corresponding to a first raised portion). The height toward the radial center side of the raised portion decreases from the bottom 4A toward the open end of the exterior case 4. Therefore, a plurality of the raised portions 10A are formed at predetermined intervals in the same manner as the concave portions 9A. The top of the raised portion 10A faces the center of the exterior case 4. In this configuration, the width of the concave portion 9A on the circumference of the bottom of the exterior case 4 is set to be, for example, [the circumference of the exterior case/the number of concave portions]×N %. N is appropriately set in a range of 1 to 30% depending on the external dimensions such as the size of the exterior case. The number of concave portions 9A is preferably, for example, three or more. When the number of the concave portions is six or more, the vibration resistance can be improved regardless of the positions of the lead portions 8 of the capacitor element 2 with respect to the concave portions 9A.

Figure 5:
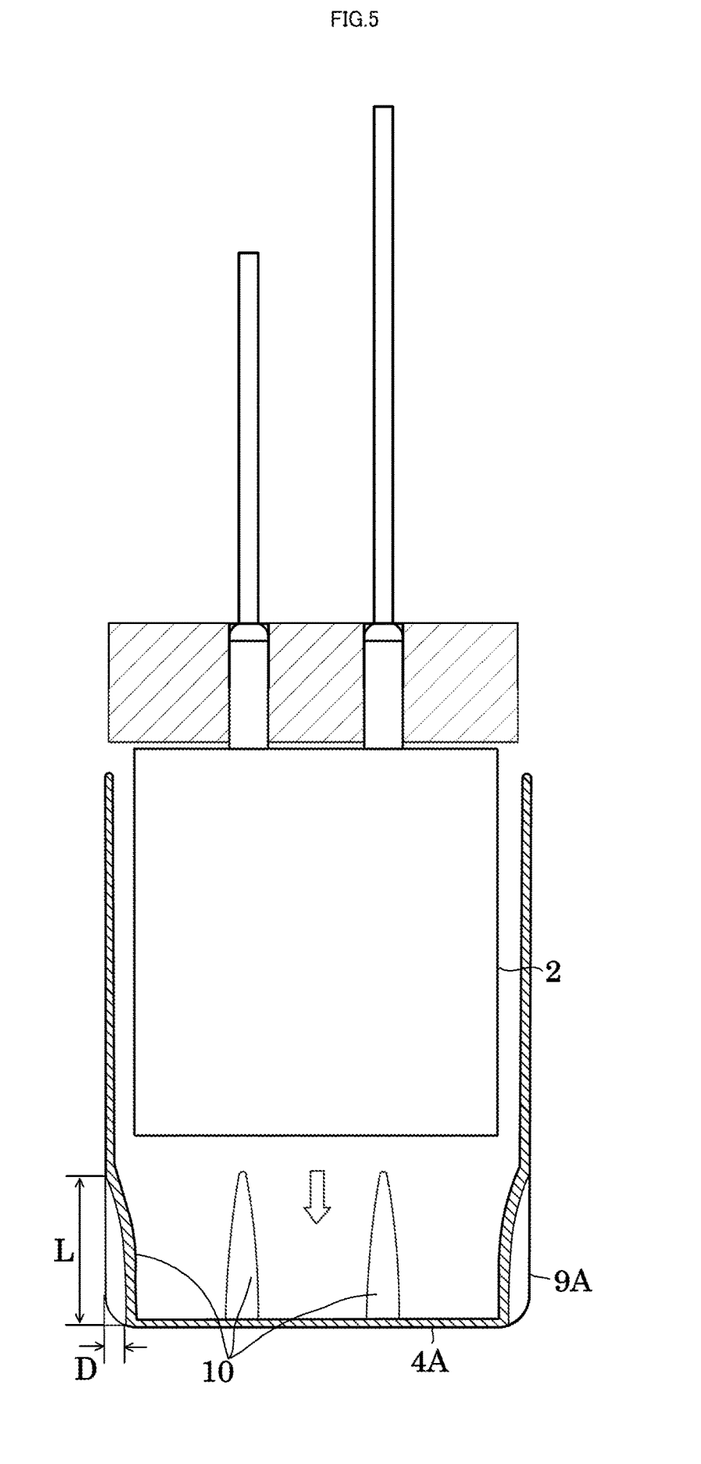
FIG. 5 is a view describing an operation of accommodating the capacitor element of the electrolytic capacitor in the exterior case according to the invention.
Figure 6:
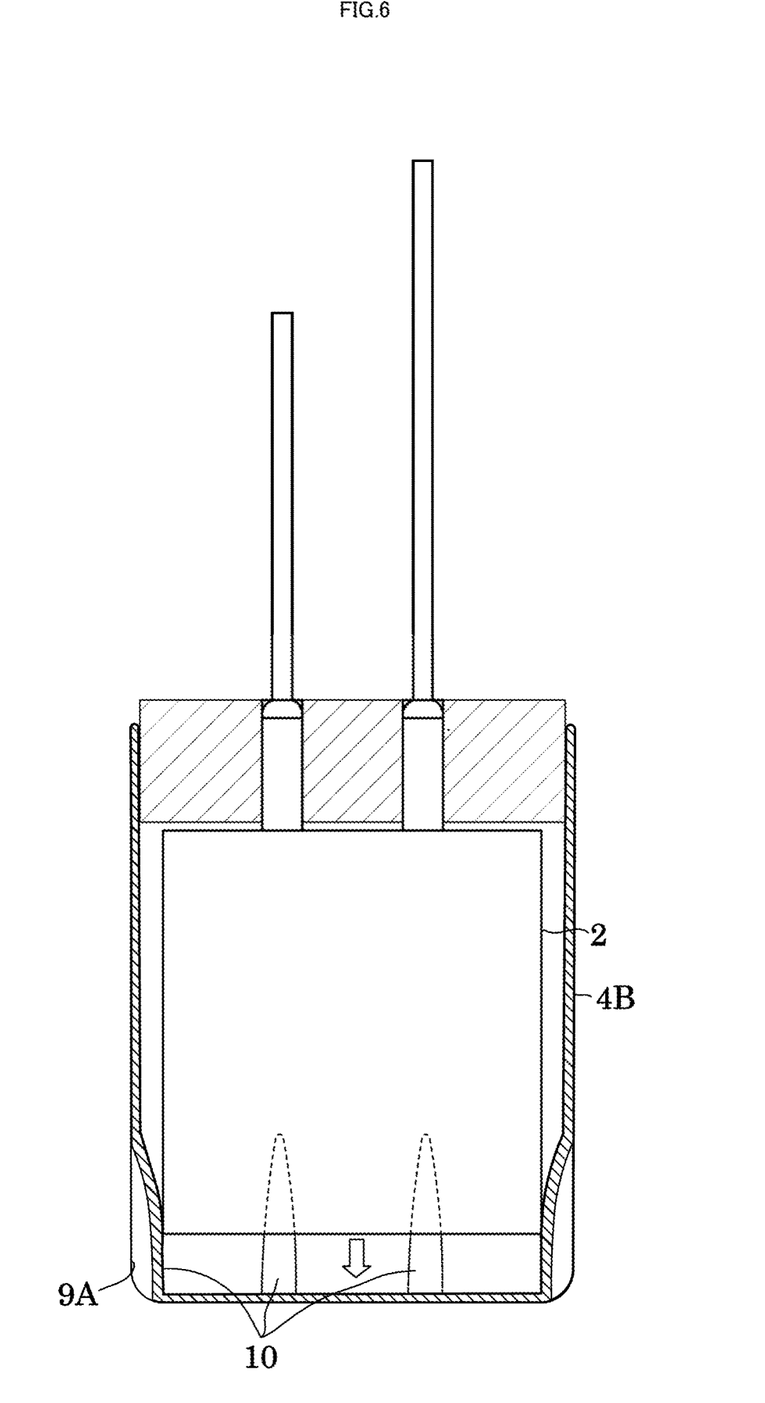
FIG. 6 is a view describing an operation of accommodating the capacitor element of the electrolytic capacitor in the exterior case according to the invention.

As shown in FIGS. 1, 5, and 6, the raised portion 10A abuts and supports the capacitor element 2.

In addition, the depth D (FIG. 5) of the concave portion 9A is set so that a part of the raised portion 10A bites into the capacitor element 2 to an extent in which breakage and disconnection of the capacitor element 2 do not occur. For example, when the exterior case 4 has a diameter of 18 mm and a length of 40 mm as in an embodiment described later, the raised portion 10A is set so as to bite into the capacitor element 2. It is preferable that the depth to which the raised portion 10A bites into the capacitor element 2 is 10% or less of the diameter of the capacitor element 2 so as not to apply excessive stress to the element.

In the process of accommodating the capacitor element 2 from the open end of the exterior case 4, as shown in FIGS. 5 and 6, the raised portion 10 abuts and supports the capacitor element 2 while gradually increasing contact area in the length direction of the raised portion 10A from the insertion distal end of the outer circumferential surface of the capacitor element 2 toward the proximal end of the lead portion side, and gradually increasing a contact area in the width direction of the raised portion 10A from the proximal end of the lead portion side toward the insertion distal end of the outer circumferential surface. In other words, the raised portion 10A abuts and supports the capacitor element 2 while elastically deforming the capacitor element 2 to a small extent.

In the process of accommodating the capacitor element 2, the raised portion 10A functions as follows. In the case where the capacitor element 2 has a large portion having a large external dimension, diameter, or the like, a pressing force acting on the portion due to contact with the raised portion 10A becomes larger than a pressing force acting on other portions. Therefore, since the vicinity of the top of the raised portion 10A is chamfered, the portion having the large outer shape of the capacitor element 2 is guided so as to enter between the separated adjacent raised portions by a restoring force (i.e., a repulsive force) caused by elastic deformation of the capacitor element 2.

The opening of the exterior case 4 is sealed by the elastic sealing member 3 in a state in which the two lead portions 8 are drawn out to the outside. The elastic sealing member 3 is arranged in a state of being compressed by a winding and tightening portion 11 formed in the opening of the exterior case 4. A valve (not shown) is provided at the bottom of the exterior case 4. When the internal pressure of the exterior case rises, the valve opens to release the internal pressure to the outside.

The elastic sealing member 3 has two through holes 12 through which the two lead portions 8 (connection portions 8A) are drawn out. The diameter of each through hole 12, in a no-load state in which no force acts on the elastic sealing member 3, is slightly smaller than the outer diameter of the connection unit 8A.

The elastic sealing member 3 is made of a composition based on rubber or a thermoplastic elastomer. Specifically, EPT (ethylene propylene terpolymer), EPDM (ethylene propylene diene monomer copolymer), IIR (isoprene isobutylene rubber), or the like is used as the rubber constituting the elastic sealing member 3.

The electrolytic capacitor 1 of the embodiment is configured as described above. Next, results of a comparison experiment between the electrolytic capacitor 1 of the embodiment and a product of a related art will be described in detail.

Embodiment

In this embodiment, the electrolytic capacitor 1 in which the capacitor element 2 is accommodated in the exterior case 4 was produced. The size of the electrolytic capacitor 1 was 18 mm in diameter and 40 mm in length. In addition, the diameter of the capacitor element 2 was 16.2 mm, the length of the concave portion 9A of the exterior case 4 was 15 mm, and the depth to which the raised portion 10A bites into the bottom of the capacitor element 2 was 0.1 mm.

<Comparative Example>

In the comparative example, a cylindrical electrolytic capacitor of a related art having no concave portions on the outer circumferential surface and no raised portions on the inner surface of the exterior case 4 was used. The size of the electrolytic capacitor 1 was 18 mm in diameter and 40 mm in length as in the embodiment.

<Vibration Test>

Three test specimens of each of the specifications of the embodiment and the comparative example were produced and subjected to vibration tests. In the vibration test, the electrolytic capacitor was subjected to a reciprocating vibration in the X, Y, and Z directions of 50 G in the range of 10 to 2,000 Hz for 15 minutes, and for two hours in each direction, 6 hours in total, whereby the presence or absence of disconnection in the inside was confirmed. The results of this vibration test are shown in Table 1. In Table 1, a circle indicates a normal condition in which no disconnection was detected, and a cross indicates an abnormal condition in which disconnection was detected.

TABLE 1

|  | 1 | 2 | 3 |
| --- | --- | --- | --- |
| Embodiment | ○ | ○ | ○ |
| Comparative Example | x | x | x |

The following can be seen from Table 1. No disconnection was observed in any of the three electrolytic capacitors of the embodiment prepared with the exterior case 4 of the embodiment of the invention. On the other hand, in each of the three electrolytic capacitors of the comparative example, disconnection in the inside was confirmed. Therefore, according to embodiment, the above-mentioned vibration test conditions which were not achieved in comparative example were achieved.

As described above, in the electrolytic capacitor 1 according to the embodiment, as the capacitor element 2 is suitably pressed and supported by forming the plurality of tapered concave portions 9A, whose depth in the radial direction becomes shallow from the bottom 4A of the bottomed cylindrical shape toward the opening side, on the outer circumferential surface 4B, the vibration resistance can be enhanced, and the strength of the exterior case itself can be enhanced.

In addition, since the raised portion 10A formed on the inner surface of the exterior case is raised toward the axial center of the exterior case 4, the raised portion functions as a guide in the process of accommodating the capacitor element 2 in the exterior case 4, and also has a function of aligning the capacitor element 2.

In particular, in the case where the capacitor element 2 has a portion having a large external dimension, the portion is guided so as to be separated from the raised portion 10A and inserted between the adjacent raised portions. Therefore, in the electrolytic capacitor of the embodiment, it is possible to prevent the capacitor element 2 from being excessively pressed by the contact between the capacitor element 2 and the raised portion 10A, and consequently, it is possible to prevent the capacitor element 2 from being damaged.

Further, since the outer circumferential surface of the capacitor element 2 extending from the insertion distal end toward the proximal end of the lead portion side is in contact with the top of the raised portion 10A by a predetermined length and a predetermined area, the pressing force on the capacitor element 2 is dispersed, and consequently, damage to the capacitor element 2 can be prevented.

The invention is not limited to the configuration of the above embodiment, and the following configurations are also disclosed.

Figure 7:
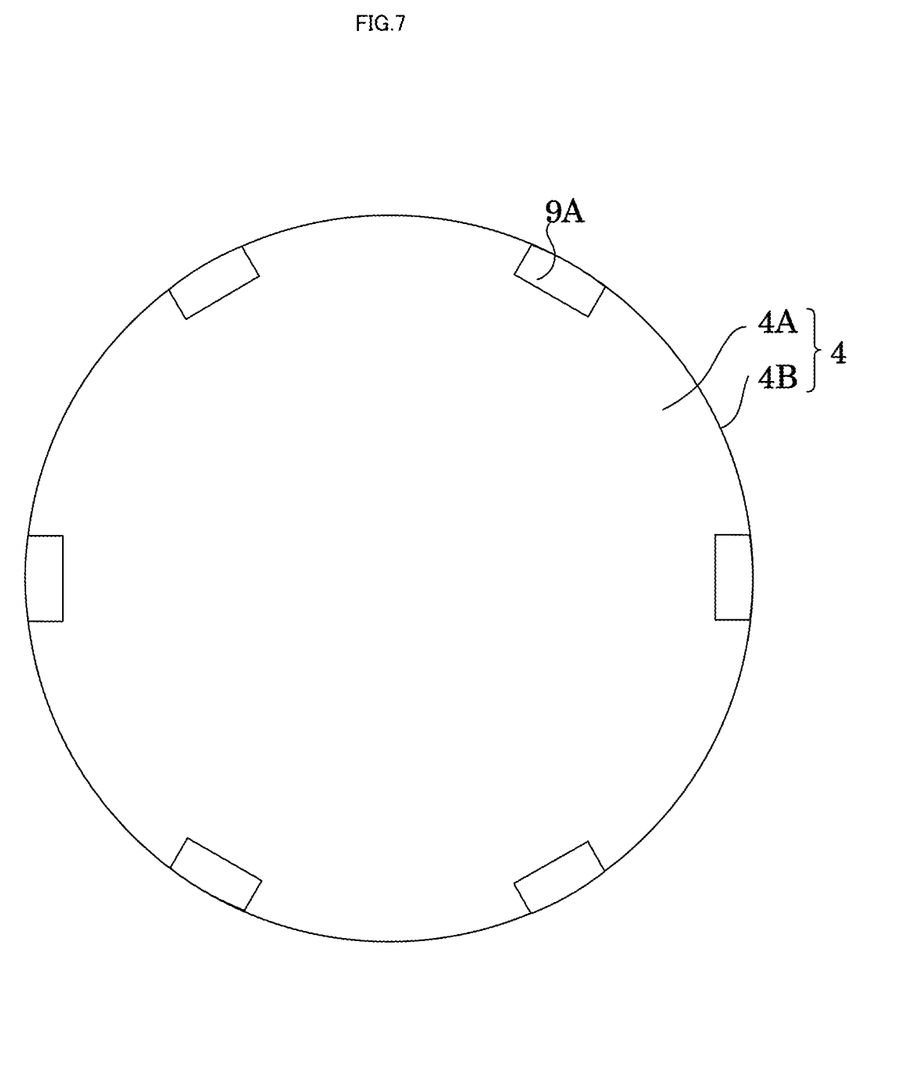
FIG. 7 is a bottom view of an exterior case used in an electrolytic capacitor according to a modification of the invention.

(1) The concave portion 9A formed in the exterior case 4 of the above embodiment has a concave curved shape, but as shown in FIG. 7, the concave portion 9A may have a rectangular shape as seen from the bottom 4A of the exterior case 4, and may have a wedge shape tapering from the bottom 4A toward the open end of the exterior case 4.

Figure 8:
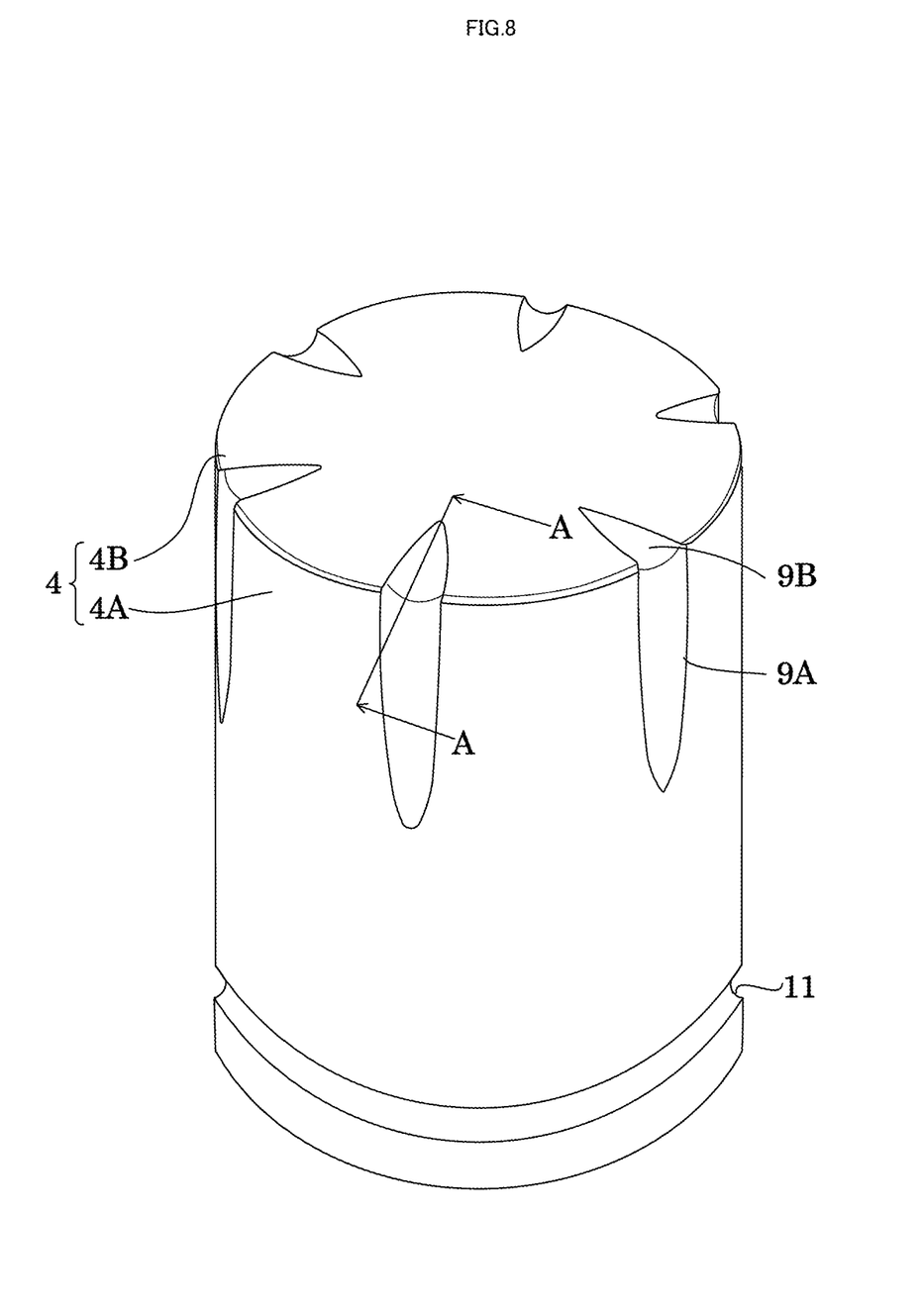
FIG. 8 is a perspective view of the exterior case used in the electrolytic capacitor according to the modification of the invention.
Figure 9:
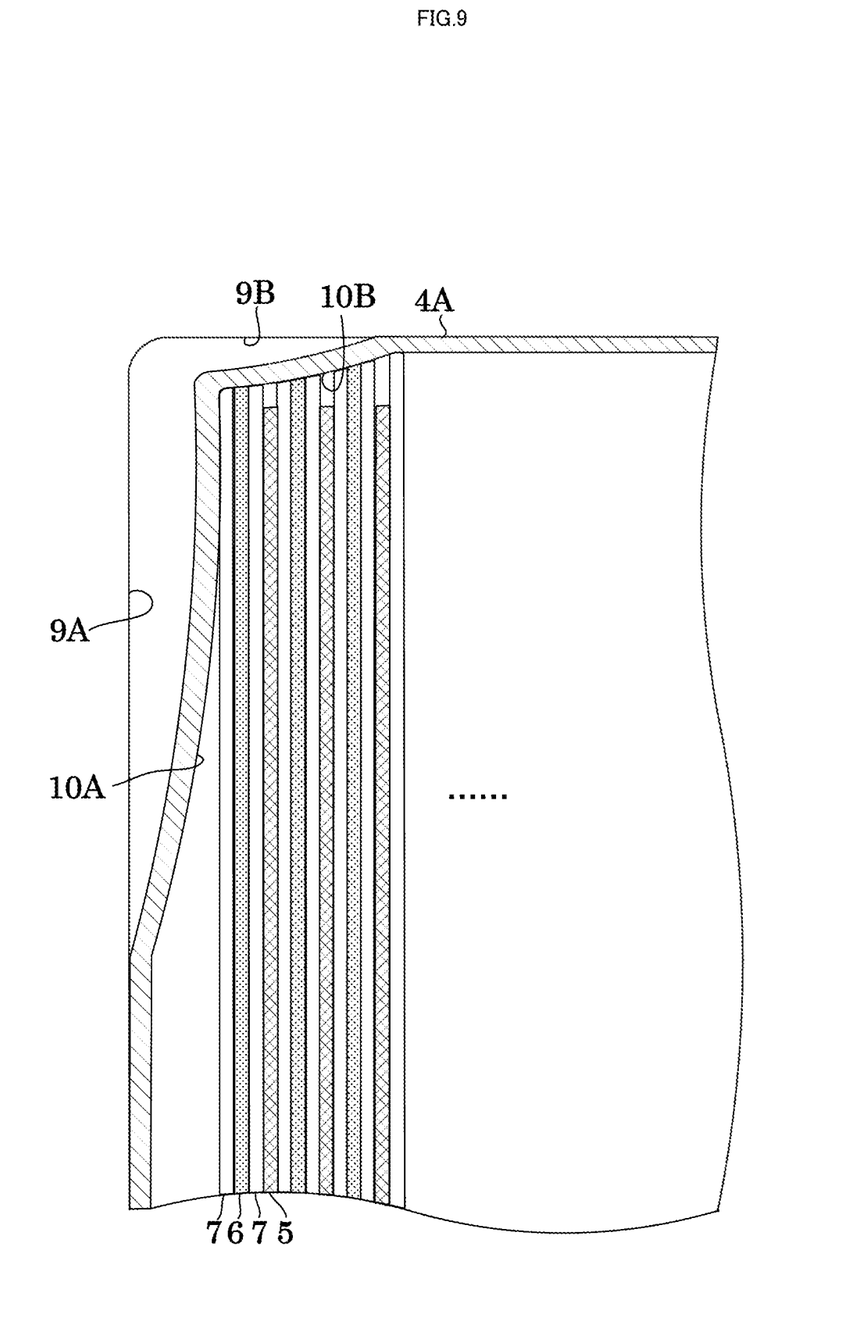
FIG. 9 is a cross-sectional view of the electrolytic capacitor shown in FIG. 8 taken along a line A-A.

(2) As shown in FIG. 8, the exterior case 4 may be configured to include a concave portion 9A which is tapered from the outer periphery of the bottom 4A toward the open end of the exterior case 4, and a concave portion 9B (corresponding to a second concave portion) which has a similar shape to the concave portion 9A and is tapered from the outer periphery of the bottom 4A toward the center thereof in a manner to be coupled to the concave portion 9A. That is, the tapered concave portion 9A, whose depth in the radial direction becomes shallow from the bottom 4A having the bottomed cylindrical shape toward the open end of the exterior case 4, is formed. Further, the tapered concave portion 9B, which is connected to the concave portion 9A on the outer circumferential side of the bottom 4A and the depth in the axial direction of which becomes shallow toward the center of the bottom 4A, is formed. As shown in FIG. 9, the inner circumferential surface located on the back surface of the concave portion 9A, which is formed on the outer circumferential surface 4B of the exterior case 4, is formed with a tapered raised portion 10A in which the height of the raised portion toward the radial center side decreases from the bottom 4A toward the open end of the exterior case 4, and a tapered raised portion 10B (corresponding to a second raised portion) in which the height of the raised portion toward the axial opening side decreases from the outer periphery of the back surface of the bottom 4A toward the center. Further, the shape of the concave portion 9B and the raised portion 10B may have the same depth (i.e., height) from the bottom 4A of the bottomed cylindrical shape toward the axial open end of the exterior case 4.

The length of the concave portion 9B formed in the bottom 4A is set to, for example, 4 mm when the diameter of the exterior case 4 is 18 mm as in the embodiment described above. That is, according to the invention including the embodiment, the length of the concave portion 9B is set to, for example, 25% or less with respect to the diameter of the bottom 4A of the exterior case 4. When a valve (for example, a cross valve) is provided on the bottom 4A, the concave portion 9B is formed on the bottom 4A so that the valve and the concave portion 9B do not overlap with each other.

When the electrolytic capacitor 1 is formed by using the exterior case 4, the capacitor element 2 is preferably configured as follows.

As shown in FIG. 9, for example, the distal ends of the cathode foil 6 and the separator 7 protrude from the anode foil 5 and come into contact with the raised portion 10B formed on the back surface of the bottom 4A of the exterior case 4. In this configuration, the width (axial length) of the cathode foil 6 may be longer than the width of the anode foil 5. Alternatively, when the width of the cathode foil 6 is the same as the width of the anode foil 5, the cathode foil 6 may be shifted to the bottom side of the exterior case 4 with respect to the anode foil 5. The anode foil 5, the cathode foil 6, and the separator 7 are wound to form the capacitor element 2. The separator 7 has a width such that the anode foil 5 and the cathode foil 6 do not come into contact with each other.

According to this configuration, since the distal end side of the capacitor element 2 and the exterior case 4 are in contact with each other, not only the vibration resistance of the electrolytic capacitor 1 can be enhanced but also the exterior case 4 functions as a heat sink because the cathode foil 6 and the exterior case 4 are in contact with each other. In this way, the electrolytic capacitor which is also excellent in heat dissipation can be configured. A part of the raised portion 10B formed on the back surface of the bottom side of the exterior case 4 may be configured to be parallel to the upper portion of the capacitor element 2.

(3) The raised portion 10 on the exterior case 4 of each of the above-described embodiments is configured such that the raised height toward the radial center side gradually decreases toward the opening of the exterior case 4 from the bottom 4A as the proximal end, but may be configured as follows.

Figure 10:
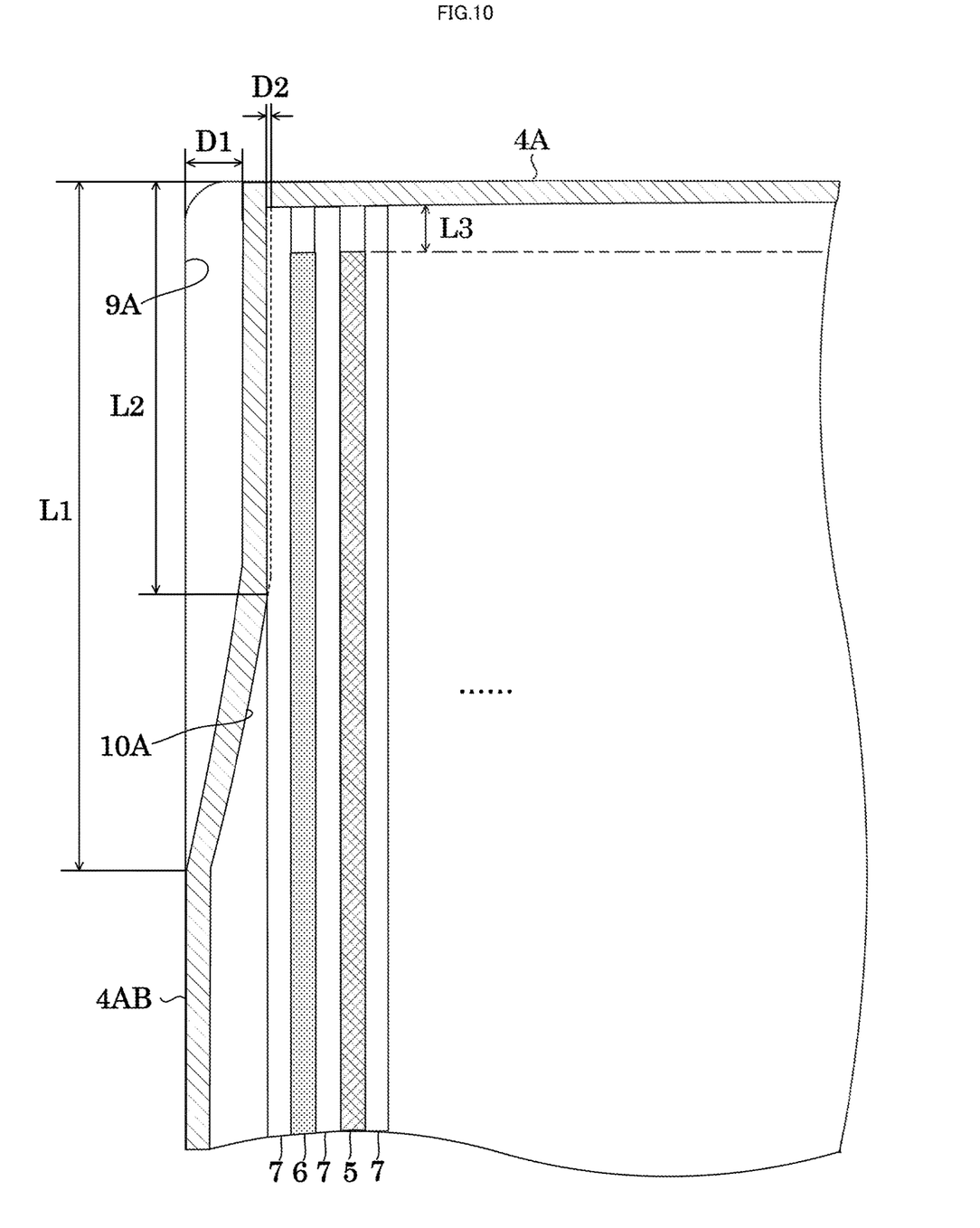
FIG. 10 is a partial cross-sectional view of the electrolytic capacitor according to the modification of the invention.

For example, as shown in FIG. 10, the top of the raised portion 10A on the inner circumferential surface of the exterior case 4 may be configured perpendicular to the bottom 4A of the exterior case 4 to extend a predetermined length from the outer circumferential end on the bottom 4A as a starting point. In an example of the embodiment, the electrolytic capacitor 1 has external dimensions as follows: The outer diameter of the exterior case 4 is 18.0 mm, the inner diameter of the exterior case 4 at a portion where the raised portion 10A is not formed is 17.3 mm, and the diameter of the capacitor element 2 is 16.2 mm. Six concave portions 9A are formed at equal intervals along the circumference of the bottom 4A.

In the case of this electrolytic capacitor 1, a depth $D1$ of the concave portion 9A in the radial direction was set to 0.6 mm, a length $L1$ in the axial direction was set to 15.0 mm, a contact length $L2$ of the raised portion 10A with the capacitor element 2 was set to 10.0 mm, and a biting $D2$ of the raised portion 10A into the capacitor element 2 was set to 0.05 mm. In addition, the separator 7 was set so as to protrude from the anode foil 5 and the cathode foil 6 and come into contact with the back surface of the bottom 4A of the exterior case 4. In this case, a protrusion length $L3$ of the separator 7 in the axial direction from both the foils 5 and 6 was set to 1.0 mm.

The electrolytic capacitor under the above conditions (hereinafter referred to as the "modification") was produced, and a vibration test was performed under the same conditions as those of the embodiment described above. As a result, breakage was not confirmed within the electrolytic capacitor in modification.

According to this configuration, since the contact length of the raised portion 10A with the capacitor element 2 is longer than that in the embodiment described above, the vibration resistance can be further improved.

Figure 11:
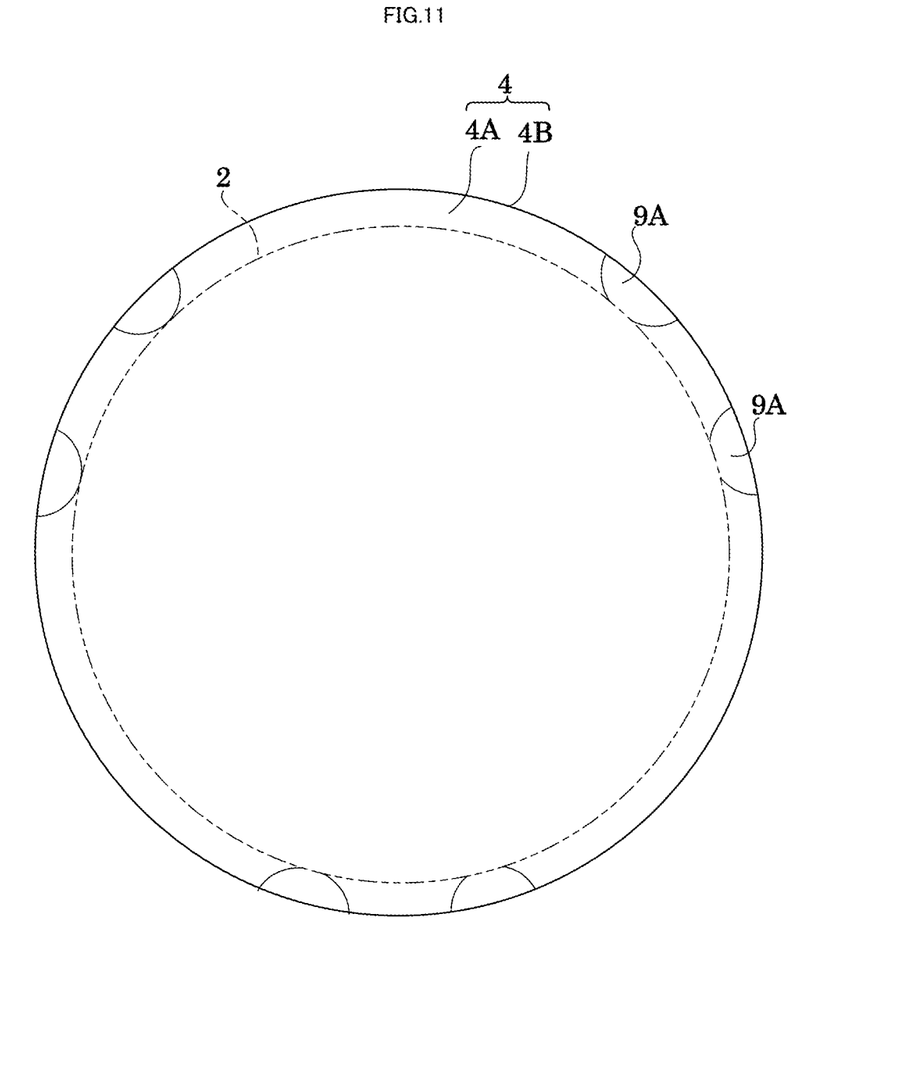
FIG. 11 is a bottom view of an exterior case used in an electrolytic capacitor according to the modification of the invention.

(4) In the exterior case 4 of the above-described embodiments, the raised portions 10 are formed at equal intervals along the circumferential direction of the bottom 4A. Alternatively, as shown in FIG. 11, for example, a set of two raised portions 10 may be formed closed to each other, and a plurality of sets may be formed at equal intervals.

(5) In the above-described embodiments, the electrolytic capacitor is described as an example, but the exterior case 4 described in each of the above-described embodiments can be applied not only to the electrolytic capacitor but also to an electronic component, in which an element is sealed with a cylindrical exterior case, such as an electric double layer capacitor or a lithium ion capacitor.

REFERENCE SIGNS LIST 1 aluminum electrolytic capacitor
2 capacitor element
3 elastic sealing member
4 exterior case
4A bottom
4B outer circumferential surface
5 anode foil
6 cathode foil
7 separator
8 lead portion
9A, 9B concave portion
10A, 10B raised portion
11 winding and tightening portion

The invention claimed is:

1. An electronic component includes:
an element in which an anode foil and a cathode foil are wound with a separator interposed therebetween;
an exterior case of a bottomed cylindrical shape which accommodates the element; and
a sealing body which seals an opening of the exterior case,
wherein an outer circumferential surface of the exterior case is formed with a plurality of tapered first concave portions whose depth in a radial direction becomes shallow from a bottom of the bottomed cylindrical shape toward the opening side,
wherein the first concave portions have a concave curved shape cross section and are formed at a predetermined interval on the outer peripheral surface of the exterior case,
whereby a plurality of tapered first raised portions, which are raised toward a center side in the radial direction, are formed on an inner circumferential surface of the case located on the back surface of the first concave portions at a predetermined interval, and the element is abutted and supported by tops of the first raised portions.

2. The electronic component according to claim 1, wherein the bottom of the exterior case has a second concave portion which extends from an outer circumferential end of the bottom toward the center of the bottom, and is recessed inward in an axial direction of the exterior case,
whereby a second raised portion located on the back surface of the second concave portion is formed on the back surface of the bottom of the case to rise toward the open end of the exterior case.

3. The electronic component according to claim 2, wherein the element is wound in a state in which the cathode foil and the separator protrude in the axial direction from the anode foil,
and the second raised portion is in contact with the cathode foil and the separator.

4. The electronic component according to claim 1, wherein the tops on the center side in the radial direction of the first raised portions are formed perpendicular to the bottom of the exterior case to extend a predetermined length along the axial direction from the outer circumferential end on the bottom of the case.

* * * * *

UNITED STATES PATENT AND TRADEMARK OFFICE
CERTIFICATE OF CORRECTION

| | |
|---|---|
| PATENT NO. | : 10,672,565 B2 |
| APPLICATION NO. | : 16/094909 |
| DATED | : June 2, 2020 |
| INVENTOR(S) | : Takaya Sakai et al. |

It is certified that error appears in the above-identified patent and that said Letters Patent is hereby corrected as shown below:

In (30) the priority date:
"April 16, 2016" should be "April 19, 2016".

Signed and Sealed this
Fifteenth Day of September, 2020

Andrei Iancu
*Director of the United States Patent and Trademark Office*